(12) United States Patent
Yang

(10) Patent No.: US 8,251,182 B2
(45) Date of Patent: Aug. 28, 2012

(54) AUTOMATIC LUBRICANT DISPENSER USING OPPOSITE DIRECTIONAL PRESSURIZATION

(75) Inventor: Yun Jong Yang, Paju-si (KR)

(73) Assignee: KLT Co., Ltd. (KR)

( * ) Notice: Subject to any disclaimer, the term of this patent is extended or adjusted under 35 U.S.C. 154(b) by 852 days.

(21) Appl. No.: 12/243,297

(22) Filed: Oct. 1, 2008

(65) Prior Publication Data

US 2009/0229920 A1 Sep. 17, 2009

(30) Foreign Application Priority Data

Mar. 17, 2008 (KR) .................. 10-2008-0024292

(51) Int. Cl.
*F16N 25/00* (2006.01)
(52) U.S. Cl. .......................................... 184/7.4
(58) Field of Classification Search ............ 184/5.1, 184/6.21, 7.3, 7.4, 8, 14.1, 25, 27.1, 32, 41, 184/45.1–2, 46, 48.1, 75, 105.1
See application file for complete search history.

(56) References Cited

U.S. PATENT DOCUMENTS

| | | | | |
|---|---|---|---|---|
| 1,595,157 A | * | 8/1926 | Hoover | 184/45.1 |
| 4,375,246 A | * | 3/1983 | Tietje | 184/45.1 |
| 4,496,030 A | * | 1/1985 | Gloviak | 184/45.1 |
| 4,941,550 A | * | 7/1990 | Blake | 184/5.1 |
| RE34,391 E | * | 9/1993 | Blake | 184/5.1 |
| 5,598,902 A | * | 2/1997 | Lin | 184/45.1 |
| 6,186,411 B1 | * | 2/2001 | Sich | 239/89 |
| 6,354,816 B1 | * | 3/2002 | Yang | 417/411 |
| 7,228,941 B2 | * | 6/2007 | Weigand et al. | 184/7.4 |
| 2008/0289906 A1 | * | 11/2008 | Przybylsky | 184/7.4 |

FOREIGN PATENT DOCUMENTS

| | | |
|---|---|---|
| JP | 51-032379 A | 3/1976 |
| KR | 10-2003-0064690 A | 8/2003 |
| KR | 10-2004-0053113 A | 6/2004 |

* cited by examiner

*Primary Examiner* — Michael Mansen
*Assistant Examiner* — Mark K Buse
(74) *Attorney, Agent, or Firm* — Park & Associates IP Law, P.C.

(57) ABSTRACT

An automatic lubricant dispenser is detachably mounted on a bearing of a machine to continuously supply lubricant to the bearing. The dispenser includes a housing for storing the lubricant inside, a piston upwardly compressing the lubricant inside the housing, a spring installed at a bottom of the piston, for compressing and elastically supporting the piston, and a flow pipe installed vertically by extending through both the housing and the piston. The flow pipe is formed with an inflow hole on a top portion thereof and an inside hollow channel so that the lubricant compressed by the piston flows into the flow pipe and is then discharged into a bottom of the housing. An operator can voluntarily control the accurate flow amount of the fluent lubricant.

6 Claims, 3 Drawing Sheets

(a)          (b)

AUTOMATIC LUBRICANT DISPENSER USING OPPOSITE DIRECTIONAL PRESSURIZATION

FIELD OF THE INVENTION

The present invention relates to an automatic lubricant dispenser using opposite directional pressurization, and more particularly, to an automatic lubricant dispenser using opposite directional pressurization which is attached to a bearing of a machine and automatically injects lubricant at regular intervals, wherein the pressing direction and the dispensing direction of the lubricant are opposite to each other.

BACKGROUND OF THE INVENTION

Rotating machineries, such as motors, pumps, and compressors, are used in most industries, and damaged bearings are a cause of failure in about 70% of cases of motor failure, and is responsible for 30~35% of failures in pumps and compressors.

The damaged bearings cost more damage than they are worth and the reason is that the damaged bearings inevitably inflict the delay of operations of the industry, which causes decreased productivity.

For these problems, the lubricant dispenser plays an important role in preventing damaged bearings and extending the lives of the bearings.

There was a way to inject directly the lubricant with a grease gun by the worker; however, there are many difficulties to be surmounted when pluralities of bearings need to be injected or they are inaccessible to the worker.

Consequently, various kinds of conventional apparatuses have been developed to inject the lubricant into the bearings and a typical example is shown in FIG. 1.

FIG. 1 is a schematic view illustrating a conventional lubricant dispenser of the prior art.

The conventional lubricant dispenser includes a cylindrical housing 1, a spring 2 installed inside the housing 1, and a piston 3 located in the bottom of the spring 2 inside the housing 1 so as to be forced by the pressure of the spring 2.

The lubricant pressurized by the piston 3 is stored below the piston 3.

At the center bottom of the housing 1, a cylindrical outlet tip 4 is formed to discharge the lubricant. The outlet tip 4 is fixed by insertion into a nipple formed in one side of the bearings in order to inject the lubricant. An inlet pipe 5 is formed to refill the lubricant at one side of the housing 1.

A ball valve (not shown) can be installed in the outlet tip 4 in order to adjust the discharged amount of the lubricant.

When the lubricant is injected into the housing 1 via the inlet pipe 5 with the above configuration, the spring 2 will become compressed while the lubricant is filled.

When the inlet pipe 5 is connected and fixed with the nipple of the bearings on the machine, the lubricant in the housing is continuously injected into the bearings through the nipple since the compressed spring 2 compresses the piston 3.

Since the piston continuously compresses the lubricant by the spring in the conventional automatic lubricant dispenser of the prior art, there can be an excessive oil-separation phenomenon in the lubricant, especially in the grease, as time goes by.

Oil-separation refers to a phenomenon in which the oil becomes separated from the grease and the solid thickener is all that is left.

When the oil-separation phenomenon occurs in the lubricant housing, the separated oil will be continuously drained away via the outlet tip located at the bottom due to gravity, only the solid thickener will be in the end left, and the grease cannot be normally discharged because the solid thickener is blocking the outlet tip.

Besides, the lubricant dispenser cannot be recycled because the lubricant cannot be refilled into the housing.

If the pressure of the spring is reduced in order to prevent the oil-separation phenomenon, the main objective of discharging the lubricant is rendered impossible because the lubricant cannot be smoothly discharged.

Because of these disadvantages, the conventional lubricant dispensers are not broadly used despite the simple structure, the inherent recycling, and the low cost.

SUMMARY OF THE INVENTION

Accordingly, the present invention has been made keeping in mind the above problems occurring in the related art, and embodiments of the present invention provide an automatic lubricant dispenser using opposite directional pressurization, which prevents the oil-separation of lubricant and provides the lubricant steadily into a bearing by pressurizing the lubricant in the direction opposing the dispensing direction.

There is also provided an automatic lubricant dispenser, wherein the operator can voluntarily control the accurate flow amount of the fluent lubricant.

According to an aspect of the invention, the automatic lubricant dispenser, which is detachably mounted on a bearing of a machine to continuously supply lubricant to the bearing, may include a housing storing the lubricant inside; a piston upwardly compressing the lubricant inside the housing; a spring installed at a bottom of the piston, for compressing and elastically supporting the piston; and a flow pipe installed vertically by extending through both the housing and the piston. The flow pipe is formed with an inflow hole on a top portion thereof and an inside hollow channel so that the lubricant compressed by the piston flows into the flow pipe and is then discharged into a bottom of the housing.

The automatic lubricant dispenser may further include an adjusting means installed at the top portion of the flow pipe in order to control the amount of the lubricant flowing into the inflow hole.

The adjusting means may include a selection valve formed with plurality of different-sized adjusting slots at a bottom circumference and rotatably coupled with the flow pipe; and a valve knob coupled with a top portion of the selection valve in order to rotate the selection valve. The inflow amount of the lubricant can be controlled in stages according to sizes of the adjusting slots connected with the inflow hole.

The adjusting means may include a slope valve formed with an inclined plane in one direction at a bottom thereof and rotatably coupled with the flow pipe; and a valve knob coupled with a top portion of the slope valve in order to rotate the slope valve. The inflow amount of the lubricant can be continuously controlled according to rotation of the slope valve.

The automatic lubricant dispenser may further include a locking pin protruding from the bottom of the piston and a locking hole formed at the bottom of the lubricant housing to allow the locking pin to be locked thereto.

The automatic lubricant dispenser may further include a knob cover installed on a top portion of the valve knob to cover the valve knob and display an open/closed status of the selection valve.

The present invention formed with the above mentioned construction is advantageous as follows.

First, the oil-separation phenomenon rarely occurs since the pressing direction and the dispensing direction of the fluent lubricant oppose each other, and the separated oil cannot be discharged out even if oil-separation takes place inside the apparatus. Therefore, the steady supply of the lubricant is continuously enabled and refilling the lubricant is easy.

Second, the accurate supply of the lubricant is possible because the flowing amount of the lubricant can be easily controlled by the adjusting means.

Third, the oil-separation phenomenon does not occur since the spring can be fixed by the locking pin when the lubricant dispenser is not used for storing purposes or during the distribution period before the initial sale, and the like. The supply of the lubricant can be immediately executed by unlocking the locking pin.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
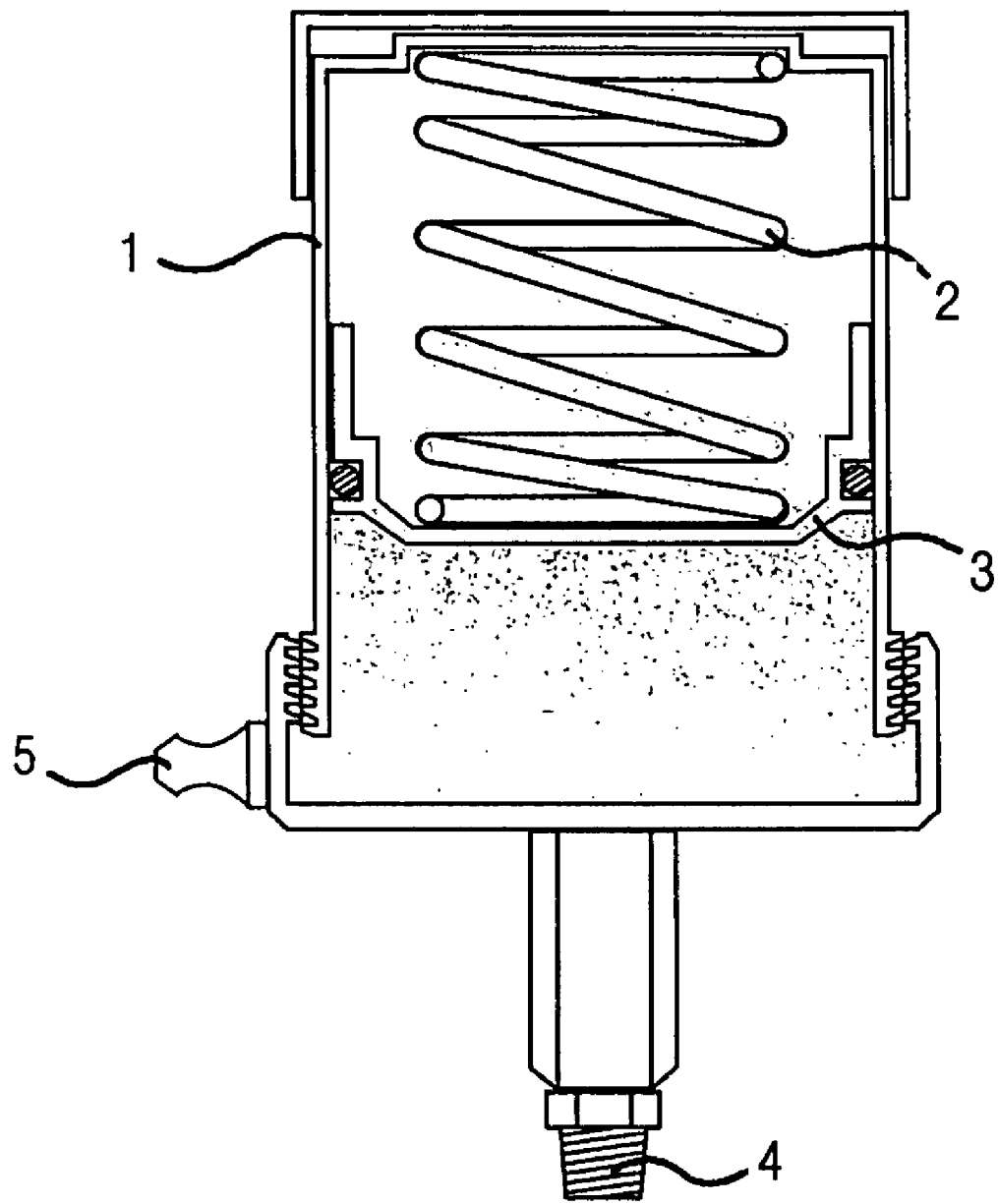
FIG. 1 is a schematic view illustrating a conventional lubricant dispenser of the prior art.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
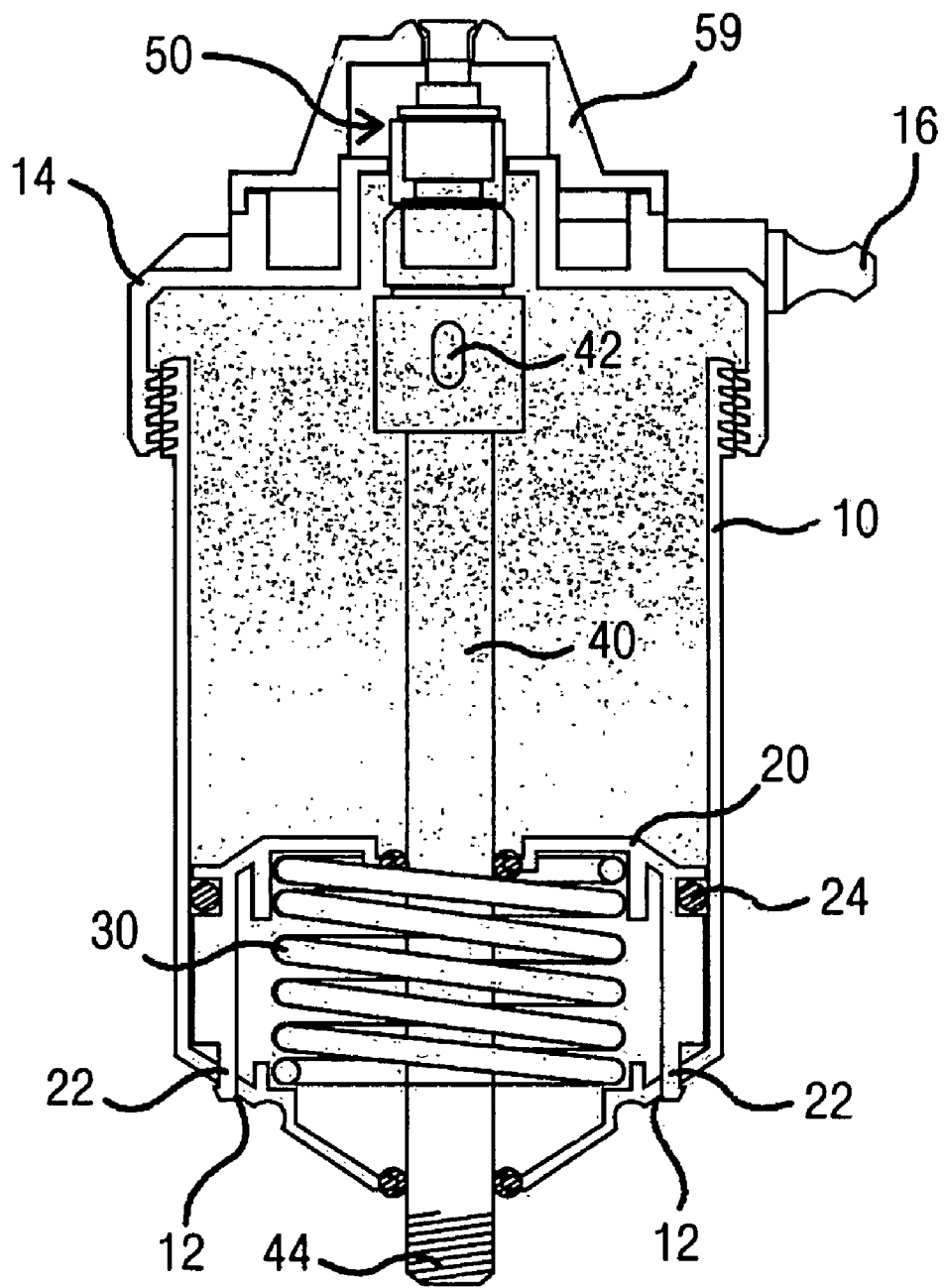
FIG. 2 is a schematic view illustrating an automatic lubricant dispenser using opposite directional pressurization in accordance with an embodiment of the present invention.

FIG. 2 is a schematic view illustrating an automatic lubricant dispenser using opposite directional pressurization in accordance with an exemplary embodiment of the present invention.

The automatic lubricant dispenser of the present invention includes a housing 10, a piston 20, a spring 30, and a flow pipe 40.

The automatic lubricant dispenser of the present invention is detachably coupled with a nipple (not shown) formed for the injection of lubricant into a rotating drive unit (a bearing) of a machine, and operates to continuously supply a small amount of lubricant.

First of all, the housing 10 will be described.

The housing 10 stores the lubricant and is configured as a container in order to house therein the piston 20, the spring 30, and the flow pipe 40.

As shown in the drawings, the housing 10 is constructed as a cylinder in which the central portion is hollow, and can be made of transparent material so that the inside is visible therethrough.

A pierced-shape locking hole 12 is formed at one side of the bottom portion of the housing 10. Two or three of the holes 12 can preferably be arranged at regular intervals.

A cover 14 is screwed onto the top portion of the housing 10, and an inflow hole 16 is formed at one side, passing through the cover 14 and the housing 10. The inflow hole 16 is adapted to inject the lubricant into the housing 10 from outside. Of course, the inflow hole 16 is properly sealed.

Next, the piston 20 will be described.

The piston 20 is installed inside the housing 10 and is constructed with an overturned round container so as to move up/down along the inner circumferential surface.

The lubricant will be filled in the top space of the piston 20, which will compress the lubricant by an up-and-down motion.

The central portion of the piston 20 is formed with a passage hole in order to allow inserting of the flow pipe 40 thereinto, and O-rings 24 are installed on both the exterior circumferential surface and the perforated inner circumferential surface of the piston 20, respectively.

The lubricant does not flow down to the bottom because the O-ring 24 formed on the exterior circumferential surface is tightly contacted with the inner surface of the housing and the O-ring 24 formed on the inner circumferential surface is tightly contacted with the inserted flow pipe 40.

At the bottom of the piston 20, a locking pin 22 is formed to be locked up by a locking hole 12 formed at the bottom of the housing 10.

The hook-shaped locking pin 22 is a normal locking means, in which the tip of the locking pin 22 will be locked up by the locking hole 12 when inserted into the same. Of course, two or three of the locking pins 22 are formed corresponding to the number of the locking holes 12.

The spring 30 will be described in the following paragraphs. The spring 30 is installed at the bottom of the piston 20 differently from the prior art and pushes the piston 20 in the upward direction while elastically supporting the same.

The spring 30 needs to be formed with more elasticity than a regular one in order to push strongly the lubricant in the upward direction by compressing the piston 20 yet should be resistant to deformation since it stays in the compressed state for a long time.

As shown in the drawings, the spring 30 is preferably installed to be contained inside the round container-shaped piston 20 so as to be inside the multiple locking pins 22. In this manner, the spring 30 is not interrupted with the locking pin 22. Next will be the descriptions about the flow pipe 40.

The hollow passage hole is formed inside the flow pipe 40 and the flow pipe 40 is constructed to pass through the center of the housing 10 and the piston 20 at the same time, and to protrude outside after passing through inside the spring 30 as mentioned earlier.

In greater detail, the top portion of the flow pipe 40 is formed inside of the housing 10 and the bottom portion is shaped to pass through the housing 10 and protrude to the outside.

An inflow hole 42 is formed to allow the lubricant to enter, and an outlet tip 44 for discharging the lubricant is formed at the bottom portion.

The lubricant compressed by the piston 20 flows into the inflow hole 42 and is discharged out via the outlet tip 44 after moving down along the hollow passage inside the flow pipe 40.

The outlet tip 44 can be formed with a male screw thread at the exterior circumferential surface in order to be inserted into the nipple of the bearing on the machine.

Another characteristic feature of the present invention is to form an adjusting means 50 on the top portion of the flow pipe 40 in order to allow the operator to control the inflow amount of the lubricant flowing via the inflow hole 42.

Figure 3:
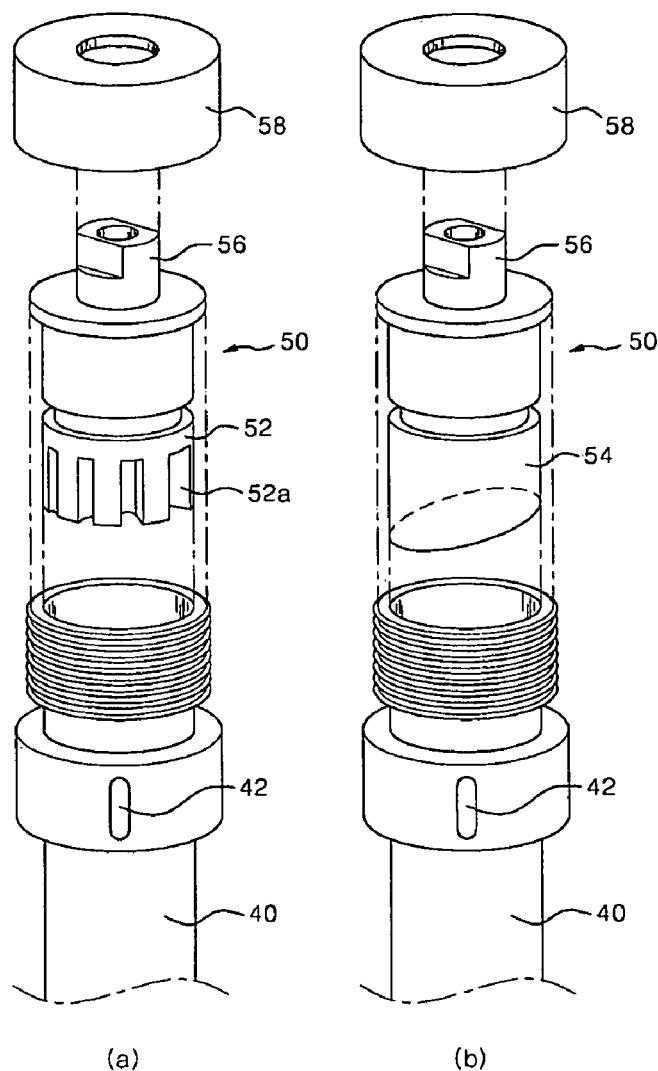
FIG. 3 is of exploded diagrams illustrating two embodiments of the adjusting means.
Figure 4:
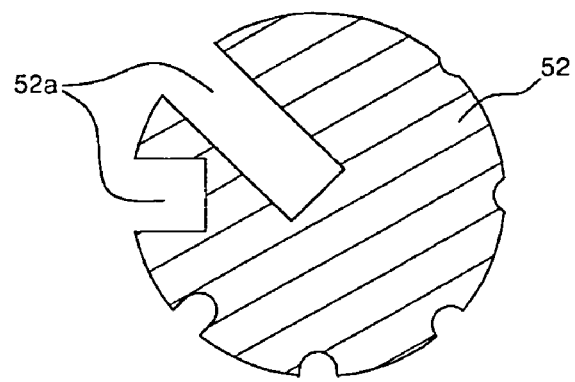
FIG. 4 is a cross-sectional view illustrating the adjusting slot of FIG. 3.

FIG. 3 is of exploded diagrams illustrating two embodiments of the adjusting means as shown in FIG. 2, in which FIG. 3(*a*) illustrates a selection valve and FIG. 3(*b*) illustrates a slope valve.

Firstly, FIG. 3(*a*) will be described.

The adjusting valve 50 consists of the selection valve 52 and a valve knob 56.

The selection valve 52 has a cylindrical shape airtightly sealed on the top portion, and is formed with a plurality of different-sized adjusting slots 52*a* at the bottom circumferential surface.

In other words, the adjusting slots 52*a* are formed of multiple stages with increasing widths and lengths from the smallest along the bottom circumferential surface of the selection valve 52, and the selection valve 52 is rotatably inserted into the top portion of the flow pipe 40.

Each of the adjusting slots 52*a* is arranged to communicate mutually with the inflow hole 42 formed on the flow pipe 40. Since the selection valve is rotatable, the operator can select the desired size of the adjusting slot 52*a*, and the amount of the lubricant flowing into the flow pipe 40 will be decided according to the selected size.

The valve knob 56 is coupled on the top portion of the selection valve 52 to enable the rotation of the selection valve 52, and a knob cover 59 can be coupled onto the valve knob 56 in order to easily rotate the valve knob 56 by hand as much as the operator needs.

The knob cover 59 is a well-known structure with a round shape, which can be rotated by hand, and numbers are printed in stages on the cover 59 in order for the operator to select the size of the adjusting slot 52*a*.

A valve fixture 58, which fixes the selection valve 52 rotatably inserted into the flow pipe 40 so as to prevent its coming off, is screwed onto the top portion of the flow pipe 40.

Another embodiment will be described referring to FIG. 3(*b*).

The adjusting means 50 consists of a slope valve 54 and a valve knob 56.

The slope valve 54 has a cylindrical shape and is formed with an inclined plane in one direction at the bottom thereof.

The slope valve 54 is rotatably inserted into the top portion of the flow pipe 40, and the inclined plane is arranged to overlap with the inflow hole 42.

Namely, the rotating inclined plane will block the inflow hole 42 as the slope valve is rotating, in which the blocking area will continually increase or decrease with rotation. Therefore, the operator can voluntarily control the amount of the lubricant flowing into the inflow hole 42.

The valve knob 56, the knob cover 59, and the valve fixture 58 have the same structure and function as already described.

For reference, a needle valve (not shown) can be additionally installed at the outlet tip 44 in order to control more precisely the inflow amount of the lubricant.

The operating condition will be briefly described in the following paragraphs.

Once the lubricant is injected via the inflow hole 16, the lubricant will be supplied into the housing 10, the piston 20 will be moved down into the lower position, and consequently the spring 30 will be compressed by this movement.

If the lubricant is injected to the maximum amount, the piston 20 will move down to the very bottom and the locking pin 22 will be locked together with the locking hole 12 making a click sound.

While this condition is maintained, the piston 20 will not compress the lubricant inside the housing 10 and the oil-separation phenomenon will never happen like before even after a long time.

When the supply of the lubricant is needed again, the locking status will be released by inwardly pushing the locking pin 22, locked into the locking hole 12, with a finger after fixing the outlet tip 44 to the nipple of the bearing on the machine, and then the piston 20 will compress the lubricant inside the housing 10 with the upward movement by the spring 30.

At the same time, the lubricant will flow into the flow pipe 40 through the inflow hole 42 and the adjusting hole 52*a* of the selection valve 52, the flowed-in lubricant will move down to the lower portion along the hollow channel of the flow pipe 40 and finally will be injected into the bearing after being discharged via the outlet tip 44.

Undoubtedly, the operator can control, by stages or continually, the inflow amount of the lubricant via the selection valve 52 or the slope valve 54 by adjusting the valve knob 56, and due to this control, an accurate amount of the lubricant will be continuously dispensed.

In this condition, the oil-separation phenomenon can partially occur because the lubricant is compressed by the piston 20, but the stable supply of the lubricant can be ensured since the excessive oil-separation will not happen and the separated oil will continuously stay in the housing 10.

As mentioned above, it is understood that the present invention is mainly focused on preventing the oil-separation phenomenon and controlling the inflow amount of the lubricant by arranging the pressing direction and the dispensing direction of the fluent lubricant inside the housing to be opposite to each other, and the true scope and spirit of the present invention will be defined by the appended claims because the above mentioned are some samples of the embodiments of the present invention.

What is claimed is:

1. An automatic lubricant dispenser comprising:
a housing for receiving lubricant inside the housing, the housing including a closed first end and a second end having a through hole;
a piston received reciprocally in the housing and having a central opening formed there-through;
a spring installed at the second end side of the housing, for compressing the piston in a first direction;
a flow pipe installed in a longitudinal direction of the housing, the flow pipe having a first end portion affixed to the first end of the housing and a second end portion extending through the central opening of the piston with the flow pipe slidably engaging in the central opening of the piston, the second end portion further extending through the through hole of the housing; and
a locking pin protruding from the piston in the longitudinal direction of the housing, and a locking hole formed at the second end of the lubricant housing to allow the locking pin to be locked thereto;
wherein the flow pipe includes an inflow hole formed adjacent to the first end portion thereof and an inside hollow channel so that the lubricant compressed by the piston in the first direction by operation of the spring flows into the flow pipe in a second direction opposite to the first direction and is then discharged from the housing through the flow pipe.

2. The automatic lubricant dispenser according to claim 1, further comprising an adjusting means installed at the first end portion of the flow pipe to adjust an inflow amount of the lubricant into the inflow hole.

3. The automatic lubricant dispenser according to claim 2, wherein the adjusting means includes:

a selection valve formed with plurality of different-sized adjusting slots at a bottom circumference and rotatably coupled with the flow pipe; and a valve knob coupled with a top portion of the selection valve in order to rotate the selection valve, wherein the inflow amount of the lubricant is controlled in stages according to sizes of the adjusting slots connected with the inflow hole.

4. The automatic lubricant dispenser according to claim 3, further comprising a knob cover installed on a top of the valve knob to cover the valve knob and display an open/closed status of the slope valve.

5. The automatic lubricant dispenser according to claim 2, wherein the adjusting means includes:

a slope valve having a body portion of generally cylindrical shape, the body portion having an inclined planar surface at a distal end thereof and rotatably coupled with the flow pipe; and a valve knob coupled with a proximal end of the slope valve in order to rotate the slope valve, wherein the inflow amount of the lubricant is continuously adjusted by rotation of the slope valve.

6. The automatic lubricant dispenser according to claim 5, further comprising a knob cover installed on a proximal end of the valve knob to cover the valve knob and provide an indication of an opening amount of the slope valve.

* * * * *